June 3, 1941.                K. MEER                2,244,653
INDICATING AND RECORDING APPARATUS
Filed June 24, 1938          2 Sheets-Sheet 1
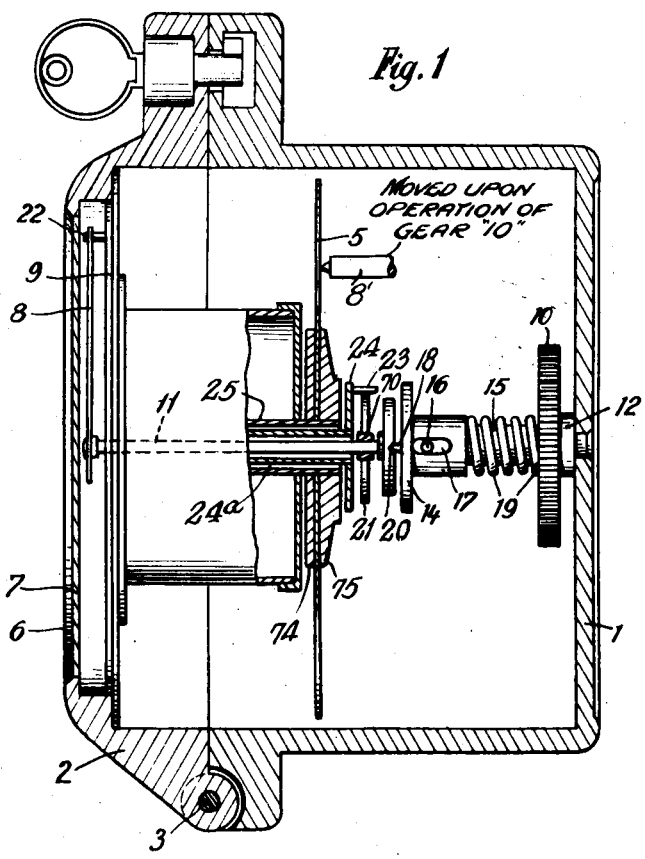

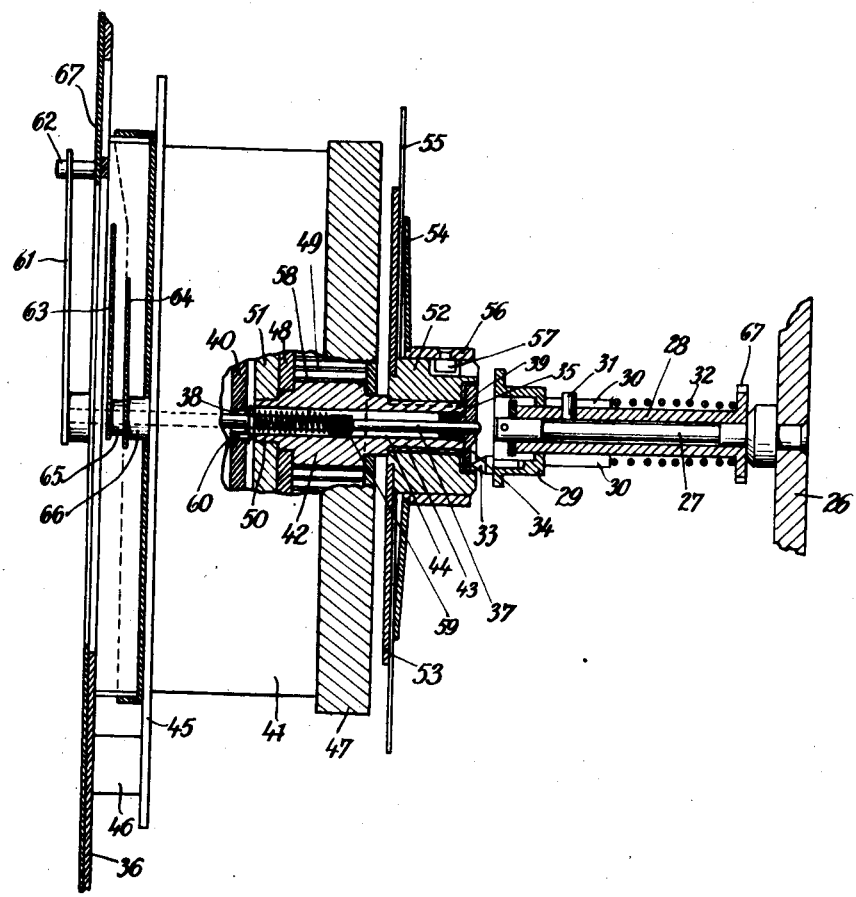

Patented June 3, 1941

2,244,653

UNITED STATES PATENT OFFICE 2,244,653

INDICATING AND RECORDING APPARATUS

Karl Meer, Villingen, Schwarzwald, Germany, assignor to Kienzle Taxameter- und Apparate A. G., Villingen, Schwarzwald, Germany Application June 24, 1938, Serial No. 215,550
In Germany July 1, 1937

5 Claims. (Cl. 234—75)

This invention relates to an indicating and recording apparatus of the kind in which a record is made on a chart or record disc fitted in the apparatus. In apparatus of this kind the record disc must be so arranged that, after the lid of the apparatus has been opened, the record on the record disc can be read.

In order to meet this requirement, the operating mechanism together with the pen or stylus is fitted in the body of the apparatus whereas the chart or record disc together with the clockwork mechanism for driving it is fitted in the lid of the apparatus, which is hinged so that it can be opened and closed. When the lid of the apparatus is opened, the clockwork mechanism and the chart or record disc swing outwards with it, so that the record on the chart becomes visible.

Now the present invention relates more particularly to controlling and recording apparatus of the type set forth and in which the factor to be controlled, for example the speed in the case of a recording speedometer, is also visibly indicated by a pointer or the like which moves over a scale. According to the invention the pointer, scale, clockwork mechanism and the chart are fitted in the lid and the operating mechanism and the stylus or the like are fitted in the body of the casing and a coupling which may be automatically connected and disconnected when the lid is closed and opened is provided between the operating or controlling mechanism and a spindle on which the pointer is mounted.

An apparatus in accordance with the invention is illustrated by way of example in the accompanying drawings, in which Figure 1 is a section taken through the middle of the apparatus with the lid or cover closed, Fig. 2 is a detail view showing in front elevation the part of the coupling which is arranged in the lid.

Fig. 3 is a sectional view through the coupling part shown in Fig. 2 on the line A—B of said figure.

Fig. 4 is a detail view showing in front elevation the part of the coupling which is arranged in the body of the apparatus.

Fig. 5 is a side elevation of the coupling part shown in Fig. 4.

Fig. 6 is a central vertical longitudinal section through another form of construction of the apparatus.

Referring to the drawings, the numeral 1 designates the body of the apparatus and 2 the lid or cover which is hinged about the hinge 3. The clockwork mechanism 4 together with the chart or record disc 5 is fixed to the lid. A sight hole 6 having a glass cover 7 is provided in the lid. Below the glass cover 7 is arranged a pointer 8 which moves over a scale 9 so that its movement are visible. The numeral 10 designates a toothed wheel or the like which is actuated by the speed responsive mechanism (not shown) and of which the angular displacement is transmitted to the stylus 8' and to the pointer 8 in the sight hole 6.

In order to transmit the indications from the wheel 10 to the pointer, the spindle 11 of the pointer is journalled centrally in the clockwork mechanism and the toothed wheel or the like 10 which is actuated by the speed responsive mechanism is journalled on a post 12 which is fixed centrally in the body 1. The actual coupling parts consist of the driven disc 13 which is fixed on the pointer spindle 11 and is illustrated separately in Figures 2 and 3 and the driving disc 14 which can move axially under the influence of a spring and is illustrated separately in Figures 4 and 5. The rotary movement of the wheel 10 is transferred to the driving disc 14 by means of the tube 15 which is fixed to the wheel 10 and is provided with a pin 16 which engages in a slot 17 in the hub of the disc 14. A pin 18 (see Figures 1, 4 and 5) is riveted to the disc 14 which can move axially on the tube 15 and is acted upon by a spring 19. The axial movement of the disc 14 is limited by the length of the slot 17. In the driven disc 13 is cut a groove 20 in which the pointed pin 18 of the disc 14 exactly fits. A spiral spring 21 ensures that the pointer 8 is held in its zero position, when the lid 2 of the apparatus is opened, by causing the pointer to bear against the stop 22.

The inner end of the spiral spring 21 is connected to the shaft 11 while the outer end of this spring is connected to a pin 23 which is fixed to a disc 24. The disc 24 is fixed to a sleeve 24a which projects into the casing of the clockwork mechanism 4 and is rigidly connected to the casing. A sleeve 25 which carries the record disc 5 is revoluble on the fixed sleeve which carries the disc 24. The sleeve 25 is rotated by the clockwork mechanism.

When the apparatus is closed and the pointer 8 and shaft 11 are in the zero, or unactuated, position, the groove 20 and the pin 18 are opposite one another. If in the apparatus according to Fig. 1 the cover 2 is opened while said device is in operation, the pointer 8 and the coupling disc 13 are moved into zero position by means of spiral spring 21. If in the meantime the machine, of which the speed or other magnitude is measured, is stopped, the gear 10 together with the coupler disc 14 is returned to normal position through a speedometer interposed between said disc and the machine. If now the cover 2 is again closed the projection 18 of disc 14 will be in alignment with the corresponding groove 20 of disc 13, so that the discs 13, 14 by means of engagement of projection 18 with said groove 20 are coupled.

The conditions will be different if cover 2 is reclosed while the machine is still running, since in this case the disc 13 has been moved to normal position, but the coupler disc 14 by means of the speedometer is held in a position other than its normal position. As the cover is reclosed the disk 13 is moved to the right in Fig. 1, and the non-grooved part of disc 13 acts against the projection 18, so that disc 14, with tensioning of spring 19, is pushed back and no coupling takes place. If in this case the machine is then stopped, the disc 14 is turned into normal position by the arrested speedometer, so that the projection 18 will again catch the corresponding groove 20 of disc 13. The spring 19 forces the pin 18 into the groove 20 and ensures accurate movement of the pointer 3 in accordance with movement of the gear 10. Owing to the resilient arrangement of the coupling part 14, the closing of the cover of the apparatus during operation does not interfere with the mechanism since, when the pin 18 does not enter the groove 20, the coupling part 14 yields so that damage is impossible.

In the form of construction illustrated in Figure 6 a spindle 27 is riveted to the inside of the casing 26 which corresponds substantially to the casing 1 in Figure 1. A sleeve 28 which is provided at the inner end with a toothed wheel 67 is revoluble on the spindle 27. The toothed wheel 67 is driven from a speed responsive device, which is not illustrated in Fig. 6, through the agency of a further toothed wheel as in Figure 1. Another sleeve 29 which is provided at the rear end with two longitudinal slots 30 is axially displaceable on the sleeve 28. A pin 31 which is fixed on the sleeve 28 projects through one of these slots to cause the sleeves 28 and 29 to rotate together. A helical spring 32 is mounted on the sleeve 28 between the sleeve 29 and th spur wheel 67. The sleeve 29 can therefore be displaced axially along the sleeve 28 against the action of the spring 32 but cannot rotate thereon. The sleeve 29 is, however, rotated by the sleeve 28 when the latter rotates.

On the front face of the sleeve 29 is fixed a driver pin 33 which normally engages in a radial groove 34 in a driver disc 35. All the parts which have just been described with the exception of the driver disc 35 are fitted in the casing 26, that is to say they remain in position when the lid 36 of the casing, which corresponds to the lid 2 in Figure 1, is opened.

The driver disc 35 is fixed on a shaft 37 which can rotate in bearings 38 and 39. The bearing 38 is fixed in a part 40 which is fitted to the casing 41 of a clockwork mechanism which is in general of the usual construction. The cylindrical spring core 42 of the clockwork mechanism is provided with a reduced sleeve-like part 43. A central bore 44 extends throughout the entire length of the spring core 42 and the reduced part 43. The other bearing 39 previously referred to is fitted in the bore 44 in the vicinity of the free end of the reduced part 43.

The casing 41 of the clockwork mechanism is fixed to the cover 36 by means of a plate 45 and pins 46 of which only one is shown in Figure 6. A milled disc 47 by means of which the clockwork mechanism is wound up is revoluble on the casing 41 of the clockwork mechanism. The rotation of the disc 47 is transmitted, by means of a mechanism which is not illustrated, to the spring box 48 which is illustrated only in part in section. The outer end of the tension spring 49 is fixed to this spring box and the inner end is connected to the core 42. The core 42 is provided with a quadrangular extension 50 to which a toothed wheel 51 is fixed. The escapement mechanism (not shown) in the casing 41 controls the rotation of this toothed wheel.

A ring 52 to which a disc 53 is fixed is screwed on to the sleeve 43 of the core 42. To this disc 53 is clamped, by means of a leaf spring 54, a record disc or chart 55 on which a diagram is drawn in the usual manner. The leaf spring 54 is fitted on a ring 56 which can be slid over the ring 52 and is fixed to it by means of a bayonet joint 57 or the like. The record disc 55 is therefore also driven in the proper time by the spring core 42.

A helical spring 58 is arranged on the shaft 37 in the above-mentioned bore 44 of the spring core 42. One end of the helical spring 58 is wound on the shaft 37 at 59 and fixed to the shaft by soldering or the like. The other end of the helical spring 58 is connected to a pin 60 which is fitted in the plate 40 of the casing 41 of the clockwork mechanism.

The helical spring 58 acts in the same manner as the spiral spring 21 illustrated in Figure 1. The pointer 61 of the speed indicator which is fitted on the spindle 37 is always returned to the zero position by the helical spring 58 when the cover 36 which carries the clockwork mechanism 41 and the parts belonging to it is raised from the casing 26. On its return movement into the zero position, the pointer 61 meets a stop 62 fixed on the cover 36. The result is therefore that, on closing the cover 36, the driver pin 33 always engages in the groove 34 in the disc 35 which is fixed to the shaft 37, when the entire apparatus is in the zero position, that is to say, in the non-operating condition.

If during the operation of the speed responsive apparatus the cover 36 is opened and then closed again, no parts of the apparatus can be damaged because the pin 33 which meets the non-grooved surface of the disc 35 is simply pressed back against the action of the spring 32. When the driving mechanism by which the toothed wheel 67 is rotated is arrested the pin 33 again engages in the groove 34.

The minute hand 63 and the hour hand 64 are driven in known manner by the aforesaid clockwork mechanism. The spindle 37 which carries the pointer 61 of the spindle indicator passes through the hollow spindles 65 and 66 of the hands 63 and 64. The pointer 61 moves over a scale 67.

I claim:

1. Apparatus comprising a casing having a cover hinged thereto adapted to be opened for access to the interior of the casing; an indicator spindle carried by the cover and extending rearwardly toward the interior of the casing and movable from unactuated to actuated position; a frontwardly visible indicator member on the spindle; means for yieldably restoring the indicator member and spindle to an unactuated position; an actuated member mounted in the casing and adapted for partial rotary movement and to be automatically restored to an unactuated position; and means automatically connecting said actuated member and spindle to each other when in said unactuated positions when the cover is moved to closed position.

2. An indicating apparatus comprising a casing having a cover carrying a clockwork; an indicator spindle mounted in and passing from the front to the rear of the clockwork and movable from unactuated to actuated position; a frontwardly visible indicator pointer mounted on the spindle in front of the clock-work; means for yieldably moving the pointer to unactuated position; an actuated spindle mounted in the casing for partial rotation in alinement with the other spindle and adapted to be brought to a position of rest; and a coupling having members connected to, and carried by said spindles respectively, and constructed and positioned to be automatically coupled when the spindles are in said unactuated and rest positions and the cover is moved to closed position and to be automatically disconnected when the cover is opened.

3. In apparatus as in claim 2, said coupling comprising a disk mounted fast on one spindle and a member mounted on the other spindle provided with a projecting pointed pin eccentric to the spindle, the disk being provided with a radial recess of V-shaped cross-section in which the point of said pin will engage when the spindles are in said positions, and a spring means tending to hold said pin in the recess; said disk having a smooth face on which the pin will yieldably engage at positions away from the recess, said face being adapted to guide the pin to the recess when the pin is moved to registration with the recess.

4. An indicating apparatus comprising a casing; a cover hinged thereto; an indicator spindle mounted in the cover and extending rearwardly toward the interior of the casing and movable from actuated to unactuated position; a frontwardly visible indicator pointer mounted on the front of the spindle; an actuated spindle mounted in the casing for partial rotation in alinement with the other spindle; a disk mounted fast on one spindle; a member mounted on the other spindle and provided with a projecting pointed pin eccentric to the spindles; the disk being provided with a substantially circular face having a radial recess of V-shaped cross-section, in which recess the point of said pin is engageable; and yieldable means to hold said pin in said recess; said disk having a smooth face on which the pin will yieldably engage when away from the recess; said face being adapted to guide the pin to the recess when the spindles are moved to bring the pin into registration with the recess.

5. Apparatus comprising a casing having a frontwardly opening cover hinged to the front thereof; a clockwork carried by the cover; a record-disk support on the rear of the clockwork and rotated thereby and adapted to releasably hold a record disk; an indicator spindle carried by the cover passing from front to rear of the clockwork and record disk centrally through the record disk; an indicator on said spindle frontward of the clockwork and record disk so as to be visible frontwardly thereof; an actuated member rotatably mounted in the casing; and coupling means for connecting said spindle and member while the cover is closed for driving the spindle and adapted for automatically disconnecting them when the cover is opened.

KARL MEER.